United States Patent
Maeda et al.

(10) Patent No.: US 7,212,484 B2
(45) Date of Patent: May 1, 2007

(54) INFORMATION RECORDING/READING HEAD

(75) Inventors: Takanori Maeda, Saitama (JP); Atsushi Onoe, Saitama (JP)

(73) Assignee: Pioneer Corporation, Tokyo (JP)

( * ) Notice: Subject to any disclaimer, the term of this patent is extended or adjusted under 35 U.S.C. 154(b) by 717 days.

(21) Appl. No.: 10/712,997

(22) Filed: Nov. 17, 2003

(65) Prior Publication Data

US 2004/0105373 A1   Jun. 3, 2004

(30) Foreign Application Priority Data

Nov. 18, 2002   (JP) .............................. 2002-333376

(51) Int. Cl.
*G11B 9/10*   (2006.01)
*G11B 9/00*   (2006.01)

(52) U.S. Cl. ...................................... 369/101; 369/126

(58) Field of Classification Search ................ 369/101, 369/126, 127, 283, 13.55, 13.35, 112.24, 369/44.14; 977/849
See application file for complete search history.

(56) References Cited

U.S. PATENT DOCUMENTS 5,581,537 A * 12/1996 Yamano et al. ............. 369/126

* cited by examiner

*Primary Examiner*—Ali Neyzari
(74) *Attorney, Agent, or Firm*—Nixon & Vanderhye P.C.

(57) ABSTRACT

There is provided a circular guard so as to surround the vicinity of a tip portion of a probe mounted on an information recording/reading head, in order to prevent dusts from touching and colliding with the probe.

19 Claims, 9 Drawing Sheets

INFORMATION RECORDING/READING HEAD

BACKGROUND OF THE INVENTION

1. Field of the Invention

The present invention relates to an information recording/reading head for recording information in an information recording medium by using a small probe or for reading information recorded in the information recording medium.

2. Description of the Related Art

In general, an optical disk apparatus, a magneto-optical disk apparatus, a Hard Disk Drive (HDD) apparatus, or the like are widely used as a high-density, large-capacity recording/reproducing apparatus. In the beginning, even these recording/reproducing apparatuses were expected to satisfy a requirement for using temporal information because it realized large capacity recording which greatly exceeded the recording capacity of a conventional recording/reproducing apparatus. However, growing the requirement for using information is unending, and a recording/reproducing apparatus which allows the high density, large capacity recording is eagerly desired to be developed.

In general, in a magnetic recording medium, the deterioration of recording bits, which is caused by thermal fluctuation, prevents the improvement of a recording density. On the other hand, in an optical recording medium, the diffraction limit of light draws an upper limit of the recording density. Therefore, in order to try to improve the recording density, one needs to overcome such limits; however, this is not easy.

Under these circumstances, a recording/reproducing apparatus using a Scanning Probe Microscope (SPM) method is under development as a technique which can realize the high density, large capacity recording. According to this recording/reproducing apparatus, it is theoretically possible to realize super high density recording, which exceeds 1 tera bit per 6.45 square centimeters (i.e. 1 square inch).

For example, a recording/reproducing apparatus using a Scanning Nonlinear Dielectric Microscopy (SNDM) method has a probe having a tip portion with a radius on the nanometer order, and it uses a ferroelectric material as a recording medium. Information is recorded by applying an electric field, which is stronger than a coercive electric field of the ferroelectric material, from the probe to the ferroelectric material and by forming polarization domains having predetermined polarization directions in the ferroelectric material. Moreover, the information is reproduced by detecting the polarization state of the ferroelectric material on the basis of frequency change of an oscillation signal, which oscillates at a resonance frequency of a resonance circuit formed from a capacitance of the ferroelectric material just under the probe and from an inductor.

Furthermore, there is also developed a SPM recording/reproducing apparatus which has a cantilever having a nonoscale tip portion and which uses a polymer film as a recording medium. In such an apparatus, information is recorded by heating the tip portion of the cantilever to put a small mark on the polymer film by the heat.

However, in the recording/reproducing apparatus using SPM or SNDM, dusts may be attached to the probe in some cases because the probe with a radius on the nanometer order is exposed in the vicinity of a recording surface of the recording medium. Of course, dusts from the outside may possibly be prevented by putting a recording/reproducing mechanism, which includes the probe and the recording medium, in a sealed case. Even inside the sealed case, however, dusts may be made by the abrasion of driving portions of the recording medium and the recording/reproducing mechanism, so that it is difficult to prevent such dusts from attaching to the probe.

The recording/reproducing apparatus using the SNDM detects the polarization state (i.e., a dielectric constant) of the ferroelectric material in order to reproduce information recorded in the ferroelectric material. The polarization state can be detected by measuring the capacitance of the ferroelectric material located just under the tip portion of the probe. In order to detect this capacitance, it is required to bring the tip portion of the probe into contact with the surface of the ferroelectric material or to position the tip portion of the probe near the surface of the ferroelectric material. Therefore, if dusts attach to the probe, the capacitance is changed by the dusts, and information reproduction accuracy decreases. Moreover, even when an electric field is applied to the ferroelectric material to record information, a distribution of the electric field to be applied changes in some cases if dusts attach to the probe. As a result, the electric field is not surely applied, and information recording accuracy decreases.

Moreover, the decrease in the accuracy of recording and reproducing may occur in the same manner, even in the recording/reproducing apparatus of a system for applying heat to a polymer film with a cantilever to record a mark.

Furthermore, in the recording/reproducing apparatus using the SPM or SNDM, the recording medium, such as a plate-shaped or disc-shaped medium, is moved parallel to its recording surface with the probe fixed. There is also the apparatus in which the probe is moved with the recording medium fixed. The probe has a radius on the nanometer order and is extremely thin. Therefore, if the probe or the recording medium is moved with dusts existing between the probe and the recording surface of the recording medium, an external force is applied to the probe, so that the probe may be destroyed. Moreover, it is also conceivable that dusts collide with the probe in motion, thereby misaligning and destroying the probe. As a result, a recording/reading head may break down, or the durability thereof cannot be improved.

SUMMARY OF THE INVENTION

It is therefore an object of the present invention to provide an information recording/reading head, which can maintain or improve the information recording and reproduction accuracy even if there are dusts, or which can protect the probe to prevent failure and to improve durability.

The above object of the present invention can be achieved by an information recording/reading head for recording information on a recording surface of an information recording medium or reproducing information recorded on the recording surface of the information recording medium, provided with: a support portion which is placed above the recording surface of the information recording medium and whose position relative to the recording surface can be changed by a position control device in a predetermined direction parallel to the recording surface; a probe whose one side is attached to the support portion and whose the other side extends to the recording surface; a guard which is attached to the support portion and which is placed in the vicinity of the probe. In this information recording/reading head, the guard is placed at a position which is a predetermined distance away from the recording surface. Further, the guard is placed at least on the forward side of the probe in a situation that the relative position of the support portion is being changed in said predetermined direction.

The nature, utility, and further features of this invention will be more clearly apparent from the following detailed description with reference to preferred embodiment of the invention when read in conjunction with the accompanying drawings briefly described below.

DETAILED DESCRIPTION OF THE PREFERRED EMBODIMENT

An embodiment of the present invention will be hereinafter explained with reference to the drawings.

Figure 1:
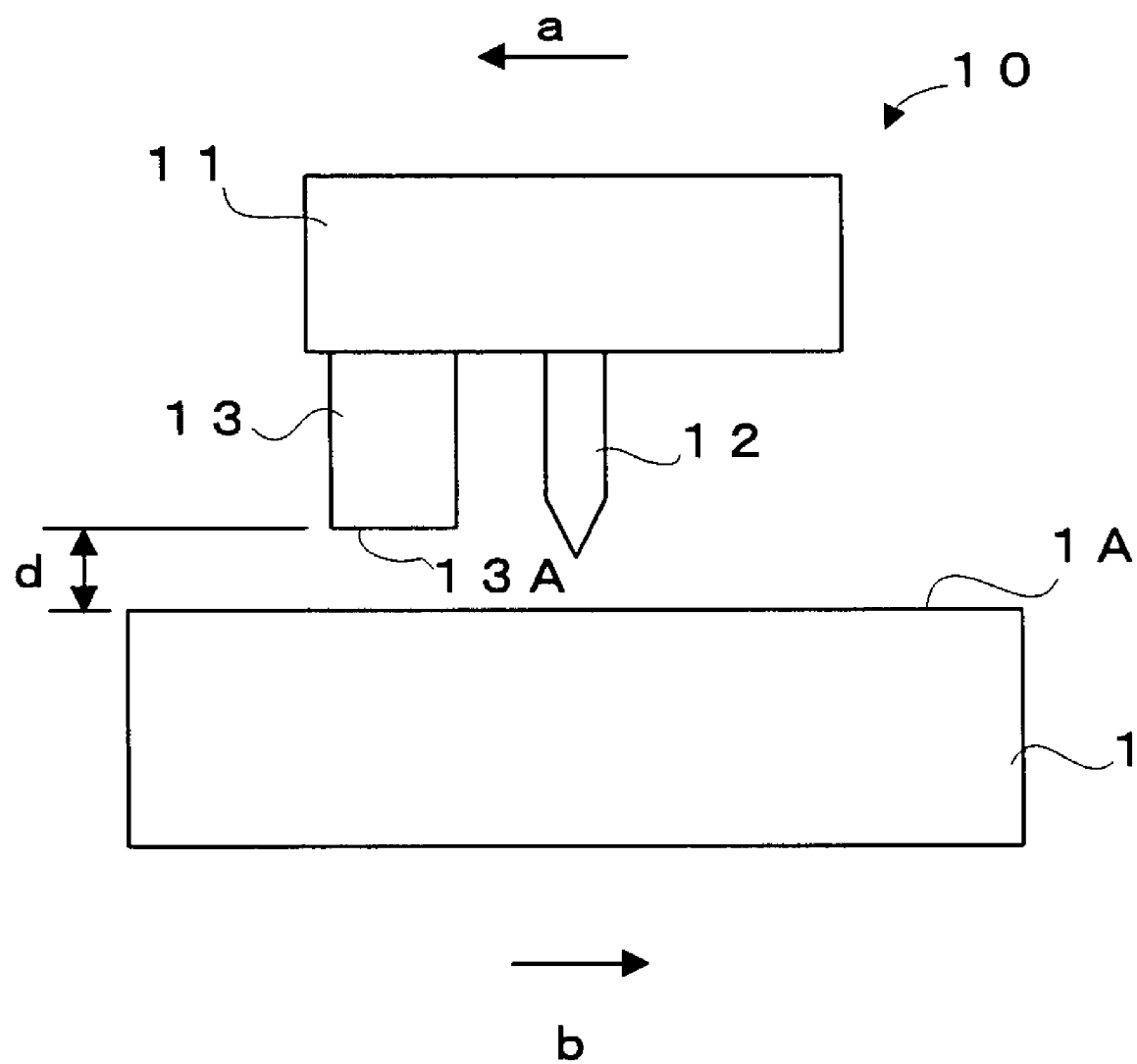
FIG. 1 is a conceptual diagram showing the construction of an information recording/reading head associated with an embodiment of the present invention.

FIG. 1 shows an information recording/reading head associated with the embodiment of the present invention along with an information recording medium. Incidentally, FIG. 1 embodies constitutional elements or the like of the information recording/reading head in the embodiment of the present invention only for the purpose of explaining technical ideas thereof. The shape, size, position, connection relationship, and the like of various constitutional elements or the like are not limited to this figure. More concrete embodiment of the information recording/reading head of the present invention will be described in the section titled "Example".

As shown in FIG. 1, an information recording/reading head 10 associated with the embodiment is an information recording/reading head for recording information on a recording surface 1A of an information recording medium 1 or for reading information recorded on the recording surface 1A of the information recording medium 1. The information recording/reading head 10 can be applied to a recording/reproducing apparatus for recording information in an information recording medium by using a probe or for reproducing information recorded in the information recording medium by using the probe, which is as follows: the recording/reproducing apparatus using SNDM, the recording/reproducing apparatus using a system for applying heat to a polymer film or the like to record a mark (i.e., a thermomechanical recording system), and a recording/reproducing apparatus for recording information by using a probe in a magnetic material, a phase change material, a near-field optical recording medium, or the like.

The geometrical shape of the information recording medium 1 is not specially limited, but it may be plate-shaped, disc-shaped, tape-shaped, or the like. One or both planes of the information recording medium 1 have the recording surface 1A formed thereon. When the information recording/reading head 10 is used for the recording/reproducing apparatus using SNDM, the information recording medium 1 is formed by using a ferroelectric material, such as lead titanate ($PbTiO_3$), lead zirconate ($PbZrO_3$), barium titanate ($BaTiO_3$), or lithium niobate ($LiNbO_3$). When the information recording/reading head 10 is used for the recording/reproducing apparatus using the thermomechanical recording system, the information recording medium 1 is the polymer film or the like.

The information recording/reading head 10 is provided with: a support portion 11; a probe 12; and a guard 13, as shown in FIG. 1.

The support portion 11 is placed above the recording surface 1A of the information recording medium 1. The position of the support portion 11 relative to the recording surface 1A can be changed by a position control device in a predetermined direction parallel to the recording surface. For example, it is possible to adopt a construction in which the information recording medium 1 is moved in the direction indicated by an arrow b in the figure by the position control device with the support portion 11 fixed, or a construction in which the support portion 11 is moved in the direction indicated by an arrow a with the information recording medium 1 fixed. The movement is not limited to one direction as long as it is parallel to the recording surface 1A of the information recording medium 1. The support portion 11 may be constructed to move arbitrarily above the recording surface 1A.

The probe 12 is supported by the support portion 11. For example, one side of the probe 12 is attached to the support portion and the other side extends to the recording surface 1A. When the information recording/reading head 10 is used for the recording/reproducing apparatus using SNDM, an electric field (e.g., a pulse voltage) corresponding to information to be recorded is applied through the probe 12 to an information recording medium formed of a ferroelectric material, which results in recording the information. Therefore, by thinning a tip portion of the probe 12 at the other end and reducing the areal size required for recording one bit on the recording surface 1A, the information recording density can be increased. In view of such a request, it is desirable to set the radius of the tip portion of the probe 12 to be on the nanometer order, but the radius size is not specially limited to this. Moreover, the length of the probe 12 and a diameter as a whole are also not specially limited, although it may have a restriction because of the strength of the probe 12 and convenience in manufacturing.

The probe 12 may be formed by using a carbon nanotube. By virtue of the carbon nanotube, it is possible to realize the probe having a tip portion with a radius on the nanometer order. Moreover, the probe 12 may be formed by using silicon. If using a field evaporation technique, it is possible to form a small silicon projection.

Furthermore, FIG. 1 shows such a construction that the probe 12 of a bar type is mounted on the support portion 11. The shape of the probe 12, however, is not limited to this. For example, the probe 12 may be constructed of a cantilever which has a cantilever arm and a projection mounted at one end of this cantilever arm.

The probe 12 may be placed with its tip portion close to the recording surface 1A of the information recording medium 1 with a small space, or with it being capable of touching the recording surface 1A. The placement of the probe 12 may be determined as occasion demands, depending on the principle, system, or the like of the information recording/reproducing.

The guard 13 is supported by the support portion 11 and is placed in the vicinity of the probe 12 to protect the probe 12. Because of this, dusts attach to the guard 13, or dusts collide with it are knocked off, so that they do not touch the probe 12. When the information recording/reading head 10 is used for the recording/reproducing apparatus using SNDM, it is desirable to place the guard 13 at a position which is a predetermined distance away from the probe 12 in order to make a condition that the probe 12 and the guard 13 are electrically separated. Because of such a placement of the guard 13, even if dusts attach to the guard 13, they do not electrically influence the probe 12.

Moreover, the guard 13 is placed at a predetermined distance d away from the recording surface 1A of the information recording medium 1, as shown in FIG. 1. Because the guard 13 is away from the recording surface 1A of the information recording medium 1, it is possible to move the information recording/reading head 10 relatively to the information recording medium 1. The predetermined distance d is preferably set to be small to prevent dusts from passing through between the guard 13 and the information recording medium 1. For example, if the radius of the tip portion of the probe 12 is on the order of sub-micrometer or nanometer, the predetermined distance d is preferably set to be between about 10 and 120 nanometers in order to protect the probe 12 from the small dusts.

If the probe 12 touches or is placed extremely close to the recording surface 1A of the information recording medium 1 (e.g. a distance between the tip portion of the probe 12 and the recording surface 1A is on the order of nanometer or sub-nanometer) upon recording or reproducing information, the predetermined distance d is preferably set to be longer than a distance between the other end portion (the tip portion) of the probe 12 and the recording surface 1A of the information recording medium 1. On the other hand, if the probe 12 is placed relatively far away from the recording surface 1A of the information recording medium 1 upon recording or reproducing information, the predetermined distance d may be equal to the distance between the other end portion (the tip portion) of the probe 12 and the recording surface 1A of the information recording medium 1.

Moreover, if the probe 12 does not touch the recording surface 1A of the information recording medium 1 upon recording or reproducing information, it is possible to adopt a construction in which the information recording/reading head 10 is floated by laminar air flow, by appropriately setting the predetermined distance d. Namely, when a positional relationship between the information recording/reading head 10 and the information recording medium 1 changes, the laminar air flows between the recording surface 1A of the information recording medium 1 and a surface 13A facing to the recording surface 1A out of the surfaces of the guard 13. This makes it possible to float the information recording/reading head 10. If such a construction is adopted, the distance between the tip portion of the probe 12 and the recording surface 1A is set to be smaller than a distance between the guard 13 and the recording surface 1A upon floating the information recording/reading head 10. This makes it possible to set the distance between the tip portion of the probe 12 and the recording surface 1A to be several nanometers when the information recording/reading head 10 floats.

Moreover, the guard 13 is placed at least on the forward side of the probe in a situation that the relative position of the support portion is being changed in the predetermined direction parallel to the recording surface 1A of the information recording medium 1 (e.g., the arrow a in FIG. 1) by moving the probe 12 or the information recording medium 1. For example, it is assumed that there are dusts on the recording surface 1A of the information recording medium 1. In this case, when the relative position of the information recording/reading head 10 with respect to the information recording medium 1 changes in the direction of the arrow a, the dusts on the recording surface 1A collide with the information recording/reading head 10 from the left side of FIG. 1. Therefore, by placing the guard 13 at least on the front side of the direction in which the information recording/reading head 10 moves relatively to the information recording medium 1, i.e., on the left side of the probe 12 in FIG. 1, it is possible to knock off or avoid dusts by using the guard 13 and to protect the probe 12 from the dusts.

When the positional relationship between the information recording/reading head 10 and the information recording medium 1 changes not only in the one direction as shown in FIG. 1, but also in the X direction or in the Y direction, parallel to the recording surface 1A of the information recording medium 1, or moreover, when it changes arbitrarily in an X-Y plane parallel to the recording surface 1A, the guard 13 is preferably placed to surround the probe 12. This makes it possible to knock off or avoid dusts by using the guard 13 and to protect the probe 12 from the dusts, even if the positional relationship between the information recording/reading head 10 and the information recording medium 1 changes in any directions in an area parallel to the recording surface 1A.

The shape of the guard 13 is not specially limited, although it may have a restriction for the purposes of preventing dusts from touching the probe 12, of allowing the change of the positional relationship between the information recording/reading head 10 and the information recording medium 1, of electrically separating the probe 12 and the guard 13, or the like, or for convenience in manufacturing.

However, if the positional relationship between the information recording/reading head 10 and the information recording medium 1 changes in the X direction or in the Y direction, parallel to the recording surface 1A of the information recording medium 1, or moreover if it changes freely in an X-Y plane parallel to the recording surface 1A, the guard 13 is preferably circular. This makes it possible to knock off or avoid dusts by using the guard 13 and to protect the probe 12 from the dusts, even if the positional relationship between the information recording/reading head 10 and the information recording medium 1 changes in any directions in an area parallel to the recording surface 1A.

Moreover, if the direction of changing the positional relationship between the information recording/reading head 10 and the information recording medium 1 is not all directions but is limited to a plurality of predetermined directions, the guard 13 may be formed to be U-shaped.

Incidentally, the guard 13 can be integrally formed with the support portion 11 by forming a pattern on a silicon substrate by a photolithography technique and by removing unnecessary parts by an etching technique, for example. Moreover, in order to form the guard 13 more finely, a lithography using an electron beam or an X ray may be performed.

As described above, according to the information recording/reading head 10 in the embodiment, it is possible to prevent dusts from touching and attaching to the probe 12 by providing the guard 13 in the vicinity of the probe 12. For example, when the information recording/reading head 10 is used for the recording/reproducing apparatus using SNDM, if dusts attach to the probe 12, a detection result of a capacitance just under the tip portion of the probe 12 changes in some cases, and the information reproduction accuracy decreases. According to the embodiment, however, it is possible to prevent dusts from attaching to the probe 12 by using the guard 13. Therefore, it is possible to prevent the deterioration of such reproduction accuracy.

Moreover, if dusts attach to the probe 12 when information is recorded by applying an electric field to the information recording medium 1 formed of the ferroelectric material, the electric field is not surely applied in some cases, and the information recording accuracy decreases. According to the embodiment, however, it is possible to prevent dusts from attaching to the probe 12 by using the guard 13. Therefore, it is possible to prevent the deterioration of such recording accuracy.

Moreover, when the information recording/reading head 10 is used for the recording/reproducing apparatus using the thermomechanical recording system for applying heat to a polymer film with a cantilever to record a mark, it is possible to knock off or avoid dusts by using the guard 13 according to the embodiment. Therefore, it is possible to have a reliable and highly accurate contact between the projection of the cantilever and the polymer film, and thereby to maintain or improve the information recording and reproduction accuracy.

Furthermore, it is possible to knock off or avoid dusts by using the guard 13 according to the embodiment. Therefore, it is possible to prevent the probe 12 from being destroyed. Consequently, it is possible to reduce the failure of the information recording/reading head 10 and increase the durability thereof.

A moving device may be added to the above-described information recording/reading head associated with the embodiment. The moving device moves the probe in a direction substantially perpendicular to the recording surface of the information recording medium. The moving device can be constructed by attaching the probe to the support portion through a piezoelectric material. By the moving device, the probe is moved relative to the support portion. If the guard is fixed on the support portion, the probe is moved relative to the guard.

By the moving device for moving the probe, it is possible to remove dusts which attach to the probe by climbing over the guard. As described above, by knocking off or avoid dusts by using the guard, it is possible to prevent effectively the dusts from attaching to the probe. However, depending on the size and shape of the dusts, some dusts possibly attach to the tip portion of the probe 12 or the like by climbing over the guard or by passing through between the guard and the information recording medium. In this case, the probe is moved by the moving device in a direction away from the recording surface of the information recording medium. This causes the dusts, which attach to the tip portion of the probe or the like, to move in the direction away from the recording surface of the information recording medium along with the probe and to collide with the guard before long, and then the dusts are cleared away and fall off from the probe by the guard pushing them. In the case of recording or reproducing information after the dusts are cleared away from the probe, the probe is moved by the moving device in a direction approaching the recording surface of the information recording medium to return to the original position. In this manner, by removing the dusts which attach to the probe by the movement of the probe, it is possible to surely increase the information recording and reproduction accuracy and the durability of the information recording/reading head.

Moreover, by the moving device for moving the probe, it is possible to adjust a positional relationship between the tip portion of the probe and the recording surface of the information recording medium (e.g. a distance between them).

On the other hand, in addition to or in place of the moving device for moving the probe, another type of moving device may be added to the information recording/reading head. This moving device moves the guard in a direction substantially perpendicular to the recording surface of the information recording medium. This moving device can be constructed by attaching the guard to the support portion through a piezoelectric material. Moreover, it is possible to construct the moving device by forming the guard itself by using the piezoelectric material.

By the moving device for moving the guard, it is possible to remove dusts which attach to the tip portion of the probe by climbing over the guard. Namely, if dusts attach to the tip portion of the probe, the guard is moved (or is deformed) by the moving device in the direction approaching the recording surface of the information recording medium. This makes it possible to push the dusts which attach to the tip portion of the probe away from the probe by using an end portion of the guard. If information is recorded or reproduced after the dusts are cleared away from the probe, the guard is moved (or is deformed) by the moving device in the direction away from the recording surface of the information recording medium and is returned to the original position to be set upon recording or reproducing information. By removing the dusts which attach to the probe by the movement (or deformation) of the guard in this manner, it is possible to surely increase the information recording and reproduction accuracy and the durability of the information recording/reading head.

Incidentally, if a movement direction (an expansion and contraction direction) of the guard is substantially perpendicular to the recording surface of the information recording medium, it is possible to remove effectively dusts which attach to the probe; however, it is also possible to set the movement direction (an expansion and contraction direction) of the guard to be another direction suitable for the removal of the dusts depending on how the dusts attach to it. Moreover, it is also possible to adopt a construction of dividing the guard into a plurality of members and of moving (or deforming) a part or all of the members independently in suitable directions.

When the above-described information recording/reading head associated with the embodiment is applied to the recording/reproducing apparatus using SNDM, i.e. a recording/reproducing apparatus of a system for recording information by applying a voltage to the information recording medium constructed from the ferroelectric substance through the probe, the guard may be constructed of an electrode in which a predetermined electrical potential is set.

When information recorded in the information recording medium is reproduced in using the information recording/reading head for the recording/reproducing apparatus using SNDM, a high-frequency electric field is applied to a ferroelectric material of the information recording medium through the probe. In this case, it is necessary to have an electrode for letting the high-frequency electric field escape from the ferroelectric material of the information recording medium. To this end, it may be constructed such that the guard itself is the electrode, or such that the electrode is formed on one portion of the guard. The predetermined electrical potential is set in the guard as being the electrode or in the electrode formed on the guard. For example, by earthing the guard as being the electrode or by earthing the electrode formed on the guard, it is possible to return the high-frequency electric field to the earthed side. The size of the guard as being the electrode or that of the electrode formed on the guard is not limited; however, if it is shaped to surround the probe (e.g. circular), it is possible to effectively let the high-frequency electric field escape.

Moreover, the above-described information recording/reading head associated with the embodiment may be constructed such that the support portion has a support surface which spreads in a direction parallel to the recording surface of the information recording medium and that a plurality of probe units, each of which is constructed from the probe and the guard, are provided on the support surface.

According to such a construction, it is possible to improve the information recording and reproduction accuracy and the durability of the information recording/reading head by protecting the probe with the guard at each place, while trying to increase the capacity of information recording and to improve an information recording and reproducing rate, or the like.

Moreover, the above-described information recording/reading head associated with the embodiment may be constructed such that the support portion has a support surface which spreads in a direction parallel to the recording surface of the information recording medium, that a plurality of probes are provided on the support surface, and that the guard is placed to surround the plurality of the probes.

Even by such a construction, it is possible to improve the information recording and reproduction accuracy and the durability of the information recording/reading head by protecting the probes with the guard, while trying to increase the capacity of information recording and to improve an information recording and reproducing rate, or the like.

The examples of the present invention will be hereinafter explained with reference to the drawings. The examples below show that the information recording/reading head of the present invention is applied to the recording/reproducing apparatus using SNDM.

FIRST EXAMPLE

The first example of the present invention will be explained with reference to FIG. 2 to FIG. 6.

Figure 2:
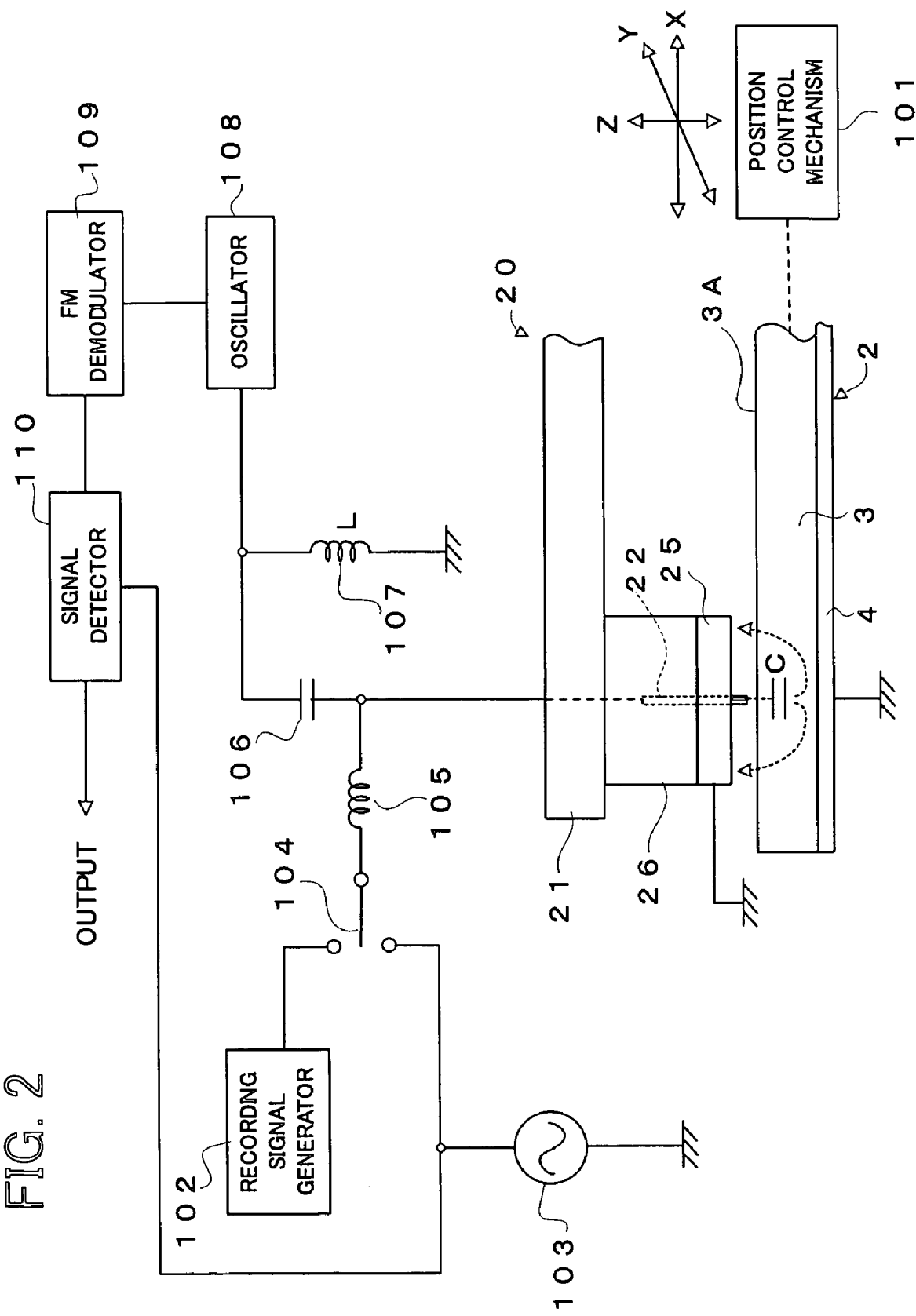
FIG. 2 is a block diagram showing the construction of a recording/reproducing apparatus associated with a first example of the present invention.

FIG. 2 is a block diagram showing the construction of a recording/reproducing apparatus which uses an information recording/reading head associated with the first example of the present invention.

A recording/reproducing apparatus 100 shown in FIG. 2 is an apparatus for recording information, such as music data, picture data, document data or a computer program, in an information recording medium 2 and for reproducing information recorded in the information recording medium 2. The recording/reproducing apparatus 100 uses SNDM as principles of data reproduction. The information recording medium 2 is provided with: a ferroelectric film 3 formed of a ferroelectric material; and a back plate 4. The back plate 4 is earthed.

The recording/reproducing apparatus 100 is provided with: an information recording/reading head 20 associated with the first example of the present invention; a position control mechanism 101; a recording signal generator 102; an alternating current (AC) signal generator 103; a shift switch 104; a first inductor 105; a condenser 106; a second inductor 107; an oscillator 108; a frequency modulation (FM) modulator 109; and a signal detector 110.

In the recording/reproducing apparatus 100, information is recorded in the information recording medium 2 as follows. The information to be recorded in the information recording medium 2 is supplied to the recording signal generator 102 from the outside. The recording signal generator 102 generates a pulse signal corresponding to the information to be recorded. When the information is recorded in the information recording medium 2, the shift switch 104 is shifted to connect the recording signal generator 102 and the first inductor 105. This causes the pulse signal generated by the recording signal generator 104 to be supplied to a probe 22 of the information recording/reading head 20 through the shift switch 104 and the first inductor 105.

The information recording medium 2 can move in the X direction and in the Y direction parallel to a recording surface 3A of the information recording medium 2 and can also move in the Z direction perpendicular to the recording surface 3A. The movement and positioning of the information recording medium 2 are performed by the position control mechanism 101. For example, before starting to record, the information recording medium 2 is far away from the information recording/reading head 20 in the Z direction, but when starting to record, the information recording medium 2 moves in the Z direction from the bottom to the top of FIG. 2 so that a distance between the recording surface 3A and a tip portion of the probe 22 of the information recording/reading head 20 is a predetermined distance D1 (refer to FIG. 3). Moreover, when starting to record, the information recording medium 2 moves in the X direction or in the Y direction so that the tip portion of the probe 22 of the information recording/reading head 20 faces to a predetermined recording position on the recording surface 3A of the information recording medium 2.

The pulse signal supplied to the probe 22 of the information recording/reading head 20 is applied to the ferroelectric film 3 of the information recording medium 2. This causes a polarization state of the ferroelectric film 3 in a portion facing to the tip portion of the probe 22 to be set in accordance with the pulse signal. The pulse signal of this kind is applied along with the movement of the information recording medium 2 in the X direction or in the Y direction. As a result, the information is recorded as the polarization state of the ferroelectric film 3.

In the recording/reproducing apparatus 100, information recorded in the information recording medium 2 is reproduced as follows. When the information is reproduced, the shift switch 104 is shifted to connect the AC signal generator 103 and the first inductor 105. This causes an AC signal generated by the AC signal generator 103 to be supplied to the probe 22 of the information recording/reading head 20 through the shift switch 104 and the first inductor 105.

Figure 3:
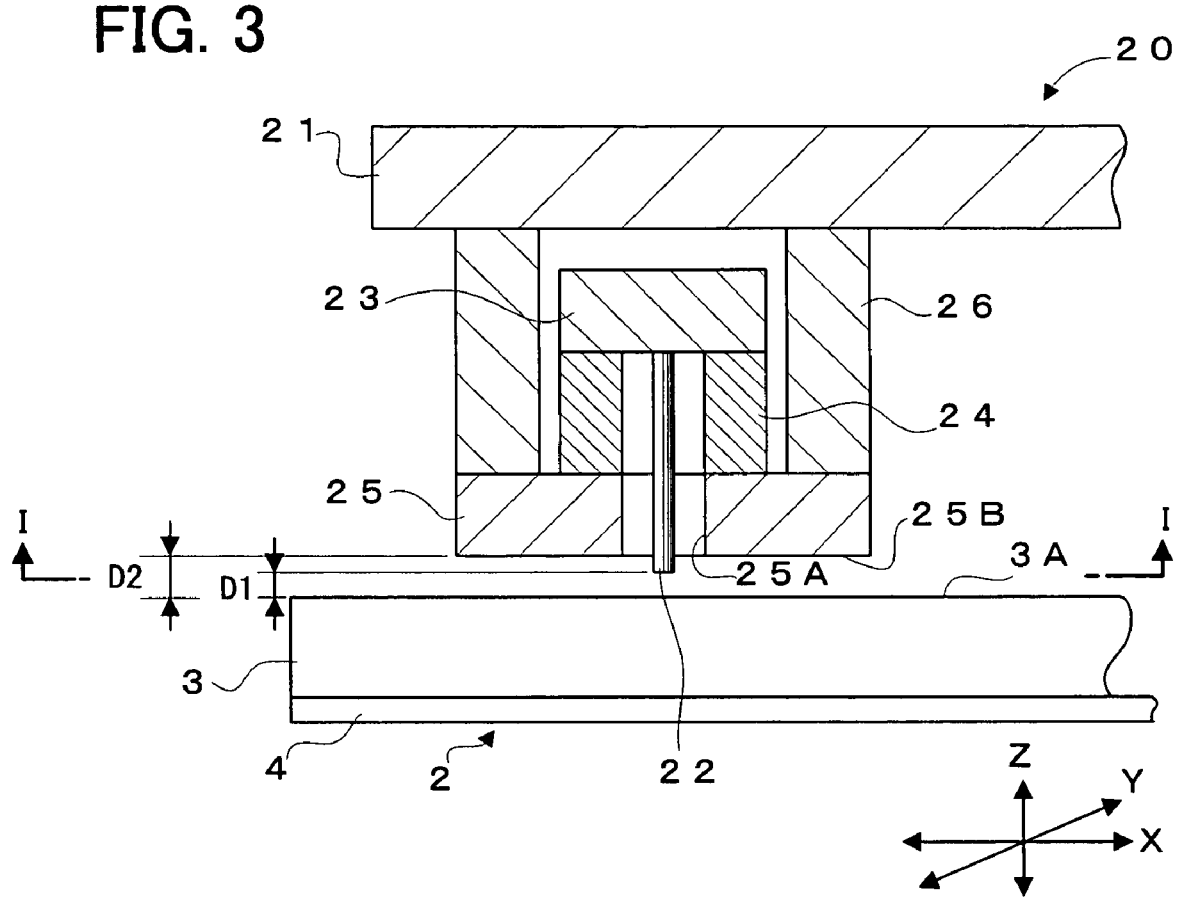
FIG. 3 is a partially sectional view showing an information recording/reading head associated with the first example of the present invention along with an information recording medium.

When the information is reproduced, as is the case of recording the information, the information recording medium 2 moves in the Z direction so that the distance between the recording surface 3A and a tip portion of the probe 22 of the information recording/reading head 20 is the predetermined distance D1 (refer to FIG. 3). Moreover, when the information is reproduced, the information recording medium 2 moves in the X direction or in the Y direction so that the tip portion of the probe 22 of the information recording/reading head 20 faces to a position at which the information to be reproduced is recorded on the recording surface 3A of the information recording medium 2.

The AC signal supplied to the probe 22 of the information recording/reading head 20 is applied to the ferroelectric film 3 of the information recording medium 2. This causes a capacitance C of the ferroelectric film 3 in the portion facing to the tip portion of the probe 22 to change depending on an alternating electric field formed by the application of the AC signal and a dielectric constant of the ferroelectic film 3. This capacitance change includes the change of a nonlinear dielectric component in which a sign (+/−) is reversed in accordance with the polarization state of the ferroelectric film 3.

The oscillator 108 oscillates at a resonance frequency of a LC resonance circuit which is constructed from an inductance L of the first inductor 107 and from the capacitance C of the ferroelectric film 3. Therefore, the frequency of an oscillation signal outputted from the oscillator 108 is modulated in accordance with the change of the capacitance C. This oscillation signal is demodulated by the FM demodulator 109 and is supplied to the signal detector 110.

The signal detector 110 is constructed from a lock-in amplifier, for example. The signal detector 110 detects the nonlinear dielectric component in which a sign is reversed in accordance with the polarization state of the ferroelectric film 3. The AC signal outputted form the AC signal generator 103 is supplied to the signal detector 110, and this AC signal is used as a reference signal upon detecting the nonlinear dielectric component. The nonlinear dielectric component as detected in this manner corresponds to the polarization state of the ferroelectric film 3, i.e. the information recorded in the ferroelectric film 3. By performing the above-described reproduction operation along with the movement of the information recording medium 2 in the X direction or in the Y direction, the information recorded in the information recording medium 2 is reproduced.

Figure 4:
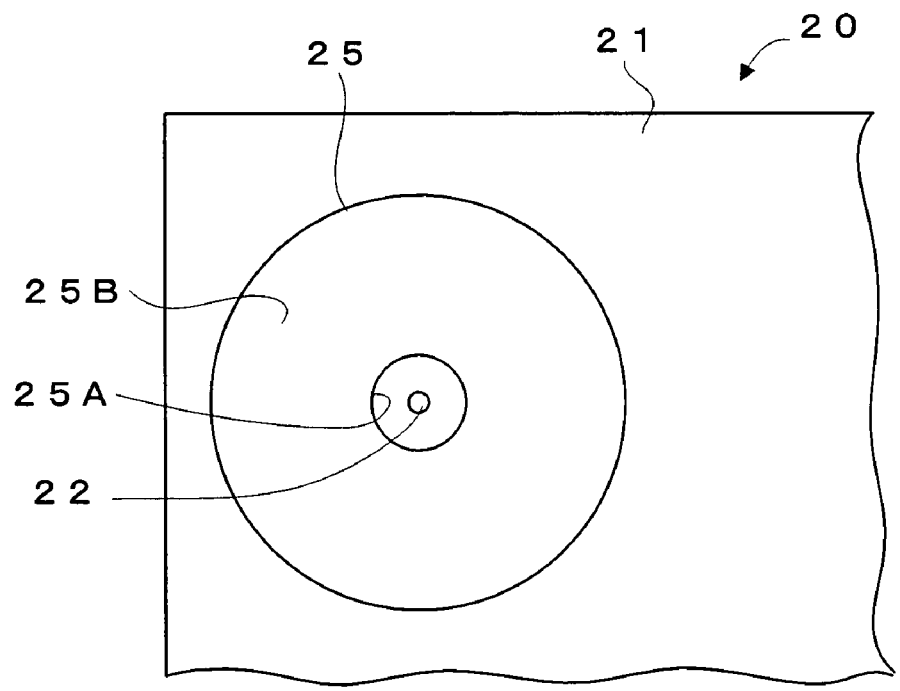
FIG. 4 is a plan view of the information recording/reading head in the FIG. 3 viewed from the direction of arrows I—I.

Next, FIG. 3 and FIG. 4 show the construction of the information recording/reading head 20 associated with the first example. FIG. 3 is a side sectional view of the information recording/reading head. FIG. 4 is a plan view of the information recording/reading head in the FIG. 3 viewed from the direction of arrows I—I.

As shown in FIG. 3, the information recording/reading head 20 is provided with: a support substrate 21; the probe 22; a probe support portion 23; a piezoelectric driving device 24; a guard 25; and a guard support portion 26.

The support substrate 21 is formed of a silicon substrate, for example, and is placed above the recording surface 3A of the information recording medium 2. A relationship between the support substrate 21 and the information recording medium 2 is changed by the information recording medium 2 moving in the X direction or in the Y direction in FIG. 3.

The probe 22 is formed in a bar shape and is supported by the support substrate 21 through the probe support portion 23, the piezoelectric driving device 24, the guard 25, and the guard support portion 26, with one end fixed to the probe support portion 23. On the other hand, the other end extends to the recording surface 3A of the information recording medium 2. The probe 22 is formed by using carbon nanotube, for example, and has a tip portion with the radius of several to several dozen nanometers at the other end. The probe 22 is electrically connected to a not-illustrated electrode formed on the support substrate 21, by wire bonding or the like. This electrode is connected to the first inductor 105 and the condenser 106 (refer to FIG. 2).

The piezoelectric driving device 24 is placed between the support substrate 21 and the guard 25, and is placed away from the probe 22 on the outer circumference side of the probe 22. The piezoelectric driving device 24 is fixed to the probe support portion 23 at one end, and is fixed to the guard 25 at the other end. The piezoelectric driving device 24 is formed of a piezoelectric material, such as PZT, and it deforms elastically (i.e. expands and contracts) in a direction perpendicular to the recording surface 3A of the information recording medium 2 by applying a control voltage from the outside. This causes the probe 22 to move in the direction perpendicular to the recording surface 3A of the information recording medium 2 (refer to FIG. 5 and FIG. 6). Moreover, a not-illustrated signal line for supplying a control voltage to control the expansion and contraction of the piezoelectric recording device 24 is connected to the piezoelectric recording device 24.

The guard 25 is placed on the outer surface side in the vicinity of the tip portion of the probe 22 so as to surround the probe 22 with a predetermined space from the probe 22. The guard 25 is supported by the support substrate 21 through the guard support portion 26. The guard 25 is formed to be circular as shown in FIG. 4. The probe 22 is placed in a hole 25A in the center of the circle. Out of the surfaces, a facing surface 25B facing to the recording surface 3A of the information recording medium 2 is a plane.

The guard 25 is formed to have conductivity and is earthed through a wiring pattern or the like placed on the guard support portion 26 and the support substrate 21. This causes the guard 25 to function as an electrode. Namely, when the information recorded in the information recording medium 2 is reproduced as described above, a high-frequency AC signal is applied to the ferroelectric film 3 through the probe 22 from the AC signal generator 103. The guard 25 functions as an electrode for returning a high-frequency electric field by this application to the earthed side.

The guard support portion 26 is placed on the outer side of the probe support portion 23 and the piezoelectric driving device 24, with one end fixed to the support substrate 21 and the other end fixed to the guard 25. The guard support portion 26 is formed of a silicon material or the like.

The guard 25 and the support portions 23 and 26 can be formed by etching a silicon substrate, for example.

As shown in FIG. 3, a distance between the probe 22 and the recording surface 3A of the information recording medium 2 is set to be the predetermined distance D1 upon recording and reproducing information. The predetermined distance D1 is several nanometers, for example. Moreover, a distance between the facing surface 25B of the guard 25 and the recording surface 3A of the information recording medium 2 is set to be a predetermined distance D2 upon recording and reproducing information. The predetermined distance D2 is preferably in a range from about 10 to about 120 nanometers. Therefore, the tip portion of the probe 22 projects from the hole 25A of the guard 25 to the information recording medium 2 upon recording and reproducing information.

According to the information recording/reading head 20, it is possible to prevent dusts from touching the probe 22 by using the guard 25 and to protect the probe 22. Namely, information is recorded or reproduced by firstly moving the information recording medium 2 in the Z direction in FIG. 3 so that the distance between the recording surface 3A of the information recording medium 2 and the tip portion of the probe 22 is the predetermined distance D1 and by then moving the information recording medium 2 in the X direction or in the Y direction. If there are dusts on the recording surface 3A of the information recording medium 2 at that time, for example, the dusts may collide with the information recording/reading head 20 in some cases because of the movement of the information recording medium 2. Even if this kind of situation happens, the dusts collide with the outer circumferential surface of the guard 25 and are knocked off. It is also possible that the dusts attach to the outer circumferential surface of the guard 25. In any case, however, it is possible to prevent the dusts from touching the probe 22 because there is the guard 25.

If dusts attach to the probe 22, a capacitance of the ferroelectric film 3, which is obtained through the probe 22, changes in some cases, and the information reproduction accuracy decreases. According to the first example, however, it is possible to prevent dusts from attaching to the probe 22 by using the guard 25. Therefore, it is possible to prevent the deterioration of such reproduction accuracy.

Moreover, when information is recorded in the information recording medium 2, if dusts attach to the probe 22, a pulse signal is not surely applied in some cases, and the information recording accuracy decreases. According to the first example, however, it is possible to prevent dusts from attaching to the probe 12 by using the guard 25. Therefore, it is possible to prevent the deterioration of such recording accuracy.

Furthermore, it is possible to prevent dusts from colliding with the probe 22 by using the guard 25 according to the first example. Therefore, it is possible to prevent the probe 22 from being destroyed. Consequently, it is possible to reduce the failure of the information recording/reading head 20 and increase the durability thereof.

Moreover, by forming the guard 25 to be circular and by placing it to surround the probe 22, it is possible to surely prevent dusts from touching the probe 22. Namely, because the information recording medium 2 moves in the X direction or in the Y direction, there is a possibility that dusts on the recording surface 3A of the information recording medium 2 may approach from any directions on the outer circumference of the probe 22. However, because the guard 25 completely surrounds the outer circumference of the probe 22, even if dusts approach from any directions, it is possible to avoid the dusts by using the guard 25. Therefore, it is possible to prevent the dusts from touching the probe 22.

Moreover, by setting the predetermined distance D2 between the facing surface 25B of the guard 25 and the recording surface 3A of the information recording medium 2 to be from about 10 to about 120 nanometers, it is possible to move the information recording medium 2 smoothly while preventing dusts from touching the probe 22. It is also possible to prevent the guard 25 from colliding with the information recording medium 2.

Figure 5:
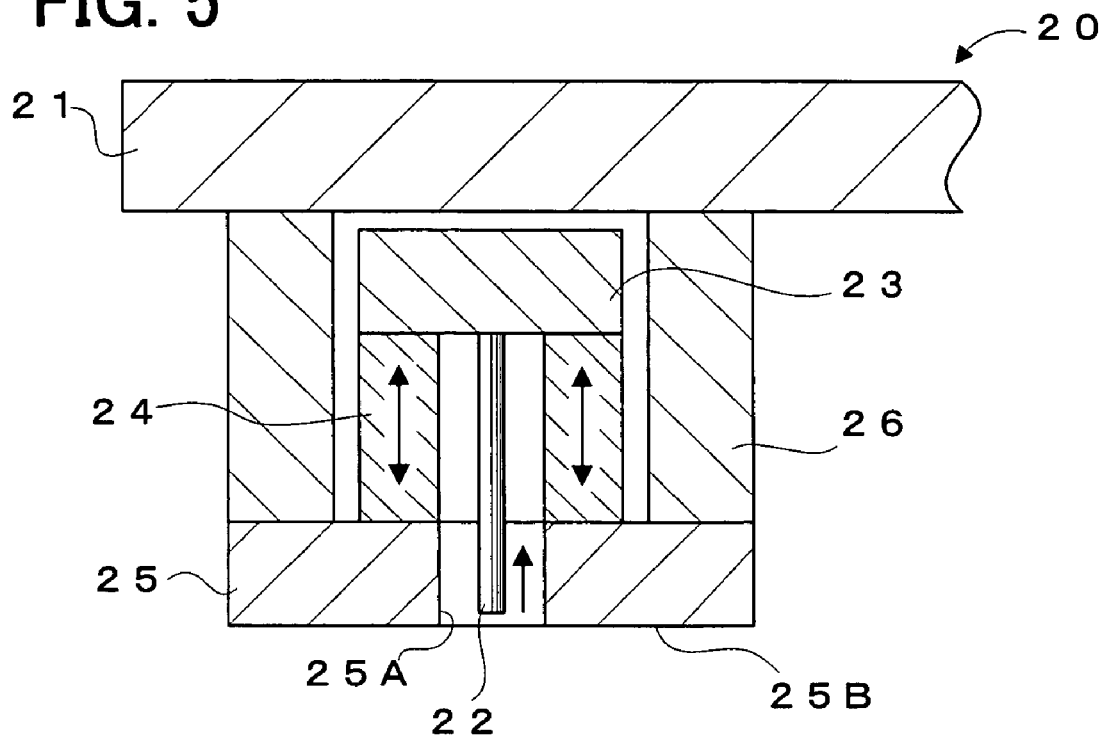
FIG. 5 is a cross sectional view showing an operation of the information recording/reading head associated with the first example of the present invention.
Figure 6:
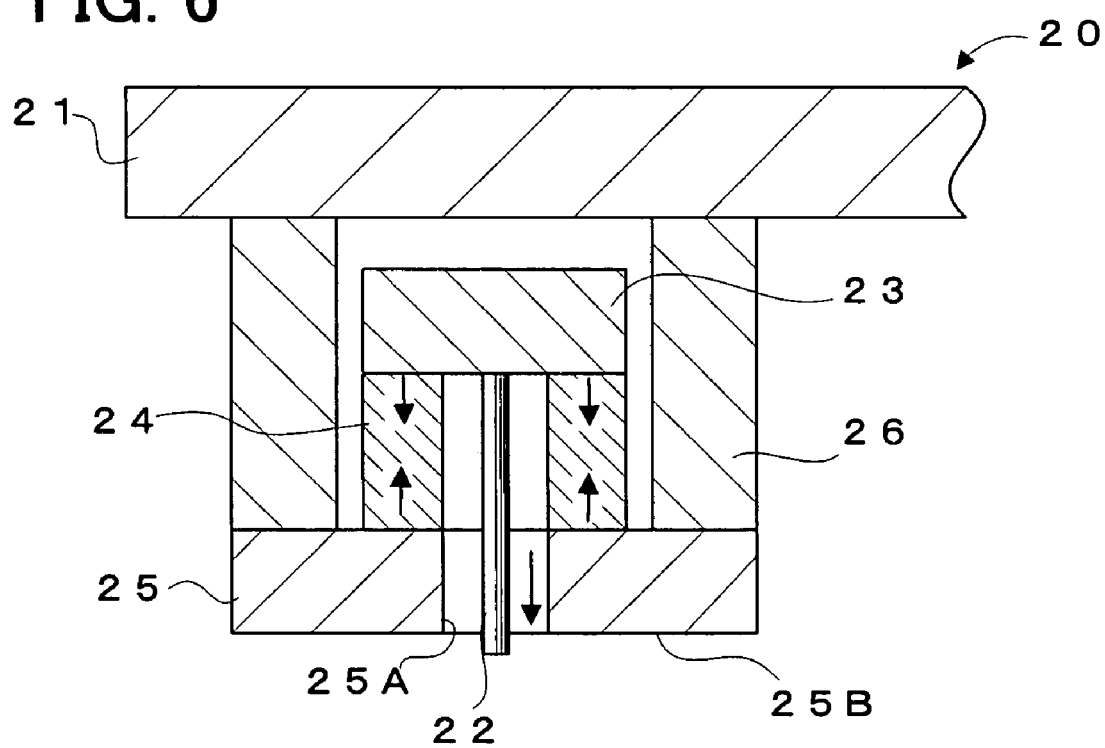
FIG. 6 is a cross sectional view showing an operation of the information recording/reading head associated with the first example of the present invention.

FIG. 5 and FIG. 6 show the movement operation of the probe 22. As described above, the piezoelectric driving device 24 is formed of a piezoelectric material, and it deforms elastically in the direction perpendicular to the recording surface 3A of the information recording medium 2 by applying a control voltage to the piezoelectric driving device 24. This causes the probe 22 to move in the direction perpendicular to the recording surface 3A of the information recording medium 2 along with the probe support portion 23. Arrows in FIG. 5 and FIG. 6 show these motions.

For example, when a control voltage is applied to the piezoelectric driving device 24, the piezoelectric driving device 24 extends as shown in FIG. 5. As a result, the probe 22 moves in a direction away from the recording surface 3A of the information recording medium 2. This causes the tip portion of the probe 22 to be drawn in to the hole 25A of the guard 25. On the other hand, when the application of the control voltage to the piezoelectric driving device 24 is stopped, the piezoelectric driving device 24 contracts (reset to the original shape) as shown in FIG. 6. As a result, the probe 22 moves in a direction approaching the recording surface 3A of the information recording medium 2. This causes the probe 22 to return to the original position shown in FIG. 3.

As described above, by moving the probe 22, it is possible to remove dusts which attach to the probe 22 by climbing over the guard 25. Namely, as described above, by knocking off or avoid dusts by using the guard 25, it is possible to effectively prevent the dusts from attaching to the probe 22. However, depending on the size and shape of the dusts, some dusts possibly attach to the tip portion of the probe 22 or the like by climbing over the guard 25 or by passing through between the guard 25 and the information recording medium 2. In this case, the probe 22 is moved in the direction away from the recording surface 3A of the information recording medium 2. This causes the dusts, which attach to the tip portion of the probe 22 or the like, to move in the direction away from the recording surface 3A of the information recording medium 2 along with the probe 22 and to collide with the guard 25 before long. As a result, the dusts are cleared away and falling off from the probe 22. In the case of recording or reproducing information after the dusts are cleared away from the probe 22, the probe 22 is moved in the direction approaching the recording surface 3A of the information recording medium 2 to return to the original position. By removing the dusts which attach to the probe 22 in this manner, it is possible to surely maintain or increase the information recording and reproduction accuracy and surely increase the durability of the information recording/reading head 20.

Incidentally, the attachment of dusts to the probe 22 causes an abnormal amplitude change of a signal obtained from the probe 22, or an abnormal detection result of the capacitance of the ferroelectric film 3. These abnormalities can be detected by mounting a detection circuit or the like, for example, on the information recording/reading head 20. For example, when the abnormality is detected while recording or reproducing information, the application of a pulse signal or an AC signal is stopped, then the movement of the information recording medium 2 is stopped, and then the information recording medium 2 is moved in the Z direction (downward in FIG. 3). Then, a control voltage is applied to the piezoelectric driving device 24 to move the probe 22 and to remove dusts which attach to the probe 22.

Moreover, by moving the probe 22, it is possible to adjust the distance between the tip portion of the probe 22 and the recording surface 3A of the information recording medium 2.

SECOND EXAMPLE

The second example of the present invention will be explained with reference to FIG. 7. Incidentally, in the second example described below, the same constitutional elements as those in the first example carry the same reference numerals and the explanations of them are omitted.

Figure 7:
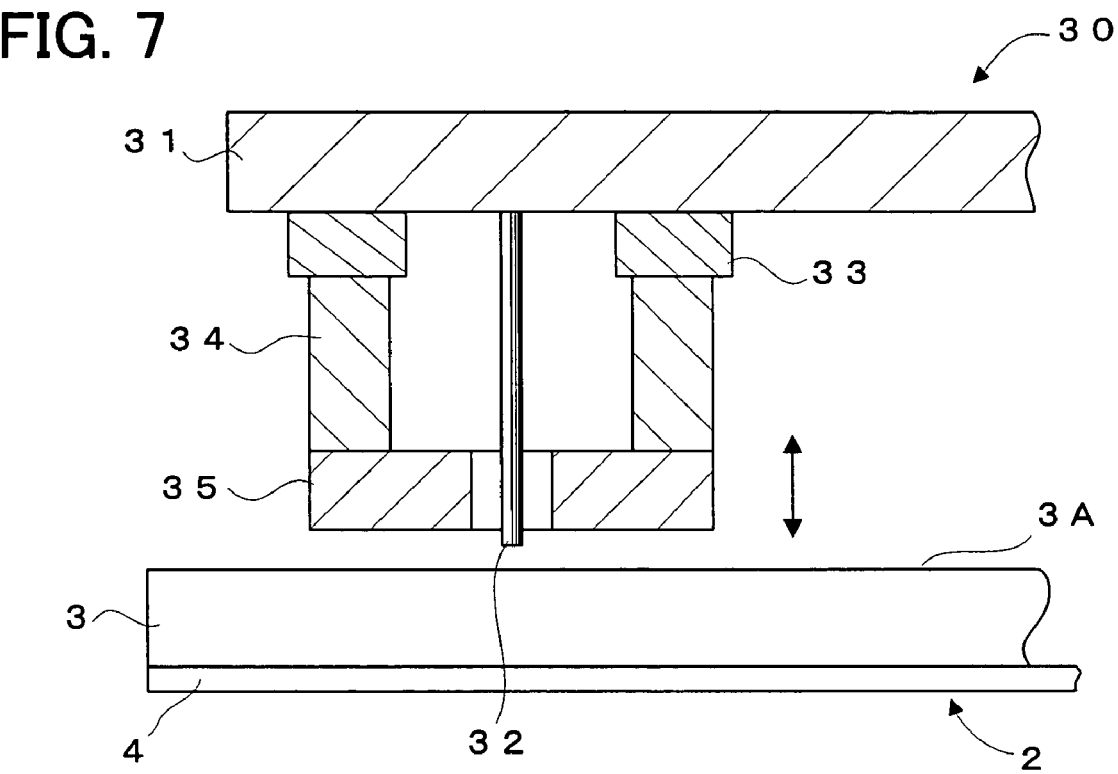
FIG. 7 is a partially sectional view showing an information recording/reading head associated with a second example of the present invention along with an information recording medium.

FIG. 7 shows the construction and operation of an information recording/reading head associated with the second example. As shown in FIG. 7, an information recording/reading head 30 associated with the second example of the present invention is provided with: a support substrate 31; a probe 32; a guard support portion 33; a piezoelectric driving device 34; and a guard 35.

The support substrate 31 is substantially the same as the support substrate 21 in the first example. The probe 32, as is substantially the same as the probe 22 in the first example, is also formed by using carbon nanotube, for example. A basal portion of the probe 32 is directly fixed to the support substrate 31. Moreover, the probe 32 is electrically and directly connected to an electrode formed on the support substrate 31. A pulse signal upon recording information or an AC signal upon reproducing information is applied to the probe 32 directly form this electrode. By directly connecting the probe 32 and the support substrate 31, it is not necessary to provide wire bonding or the like for connecting the probe and the electrode, which facilitates the manufacturing thereof.

The guard 35, as is substantially the same as the guard 25 in the first example, is formed of a silicon material or an electrically conductive material, for example, to be circular. It is placed on the outer circumference side in the vicinity of a tip portion of the probe 32 with a predetermined distance from the probe 32. The guard 35 is fixed to the support substrate 31 through the guard support portion 33 and the piezoelectric driving device 34.

The piezoelectric driving device 34 is formed of a piezoelectric material, such as PZT, and elastically deforms in a direction perpendicular to the recording surface 3A of the information recording medium 2 by applying a control voltage from the outside through a not-illustrate signal line. Therefore, turning ON and OFF the control voltage allows the guard 24 to move in the direction perpendicular to the recording surface 3A of the information recording medium 2 (refer to an arrow in FIG. 7).

Even by the information recording/reading head 30 having such a construction, as is substantially the same as the information recording/reading head 20 in the first example, it is possible to protect the probe 32 from dusts by using the guard 35. Therefore, it is possible to try to improve the information recording and reproduction accuracy and the durability of the information recording/reading head 30.

Moreover, by moving the guard 35, it is possible to remove dusts which attach to the tip portion of the probe 32 by climbing over the guard 35. Namely, if dusts attach to the tip portion of the probe 32, a control voltage is applied to the piezoelectric driving device 34 to extend the piezoelectric driving device 34 and to move the guard 35 in a direction approaching the recording surface 3A of the information recording medium 2. This makes it possible to push the dusts which attach to the tip portion of the probe 32 away from the probe 32 by using an end portion of the guard 35. If information is recorded or reproduced after the dusts are cleared away from the probe 32, the control voltage which is being applied to the piezoelectric driving device 34 is stopped, the piezoelectric driving device 34 is reset to the original shape, and the guard 35 is moved in a direction away from the recording surface 3A of the information recording medium 2. This causes the probe 32 to return to the original position to be set upon recording or reproducing information. In this manner, the dusts which attach to the probe 32 can be removed by the movement of the guard 35. Therefore, it is possible to surely maintain or increase the information recording and reproduction accuracy and surely increase the durability of the information recording/reading head 30.

Figure 8:
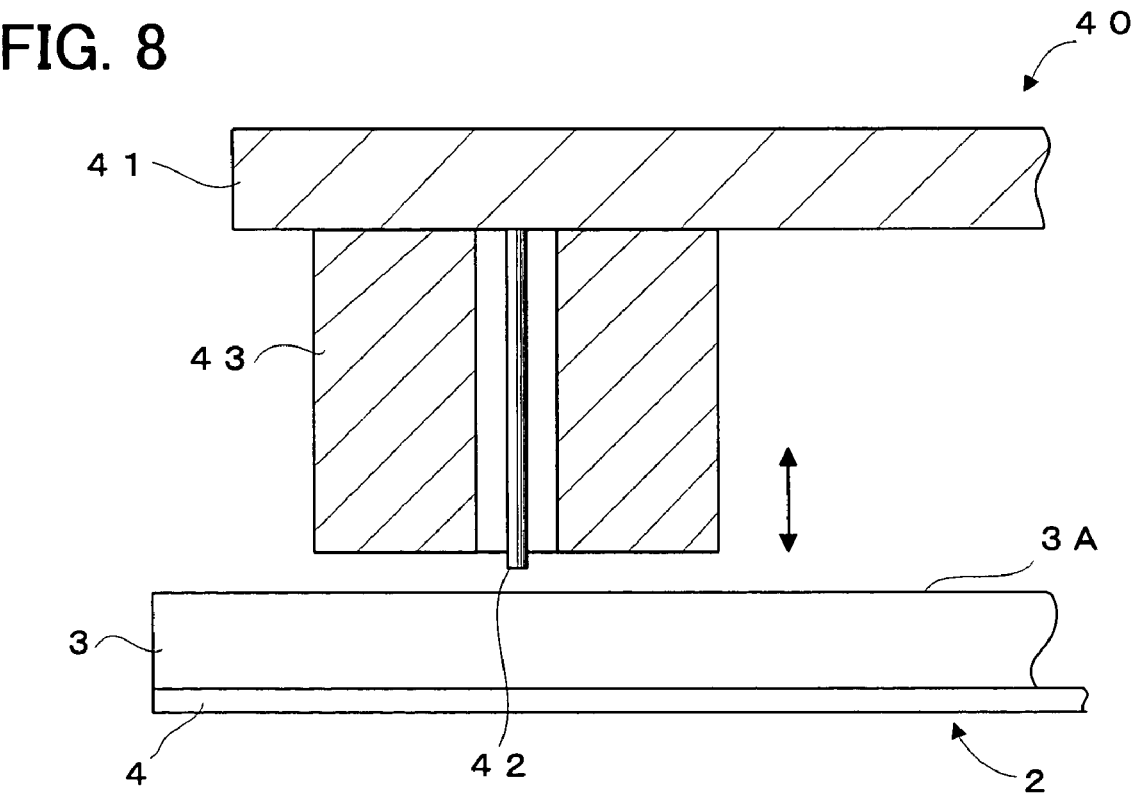
FIG. 8 is a partially sectional view showing a modified example of the information recording/reading head associated with the second example of the present invention along with an information recording medium.

Incidentally, the information recording/reading head 30 shown in FIG. 7 is constructed to support the guard 35 with the support substrate 31 (the guard support portion 33) through the piezoelectric driving device 34 and to move the guard 35 by using the elastic deformation (i.e. expansion and contraction) of the piezoelectric driving device 34. However, the present invention is not limited to this construction, and may adopt a construction of forming the entire guard by using a piezoelectric material. FIG. 8 shows a specific example in the case of forming the entire guard by using the piezoelectric material. As shown in FIG. 8, a guard 43 is formed to surround a probe 42 on the outer circumference side of the probe 42 supported by a support substrate 41. The guard 43 is formed of a piezoelectric material, such as PZT, to be circular. The guard 43 extends in a direction perpendicular to the recording surface 3A of the information recording medium 2 by applying a control voltage from the outside, and resets to the original shape (refer to FIG. 8) if the application of the control voltage is stopped. Even in this construction, it is possible to remove dusts which attach tot the probe 42 by the deformation of the guard 43. Therefore, it is possible to surely maintain or increase the information recording and reproduction accuracy and surely increase the durability of an information recording/reading head 40.

THIRD EXAMPLE

The third example of the present invention will be explained with reference to FIG. 9 and FIG. 10. Incidentally, in the third example described below, the same constitutional elements as those in the first or second example carry the same reference numerals and the explanations of them are omitted.

Figure 9:
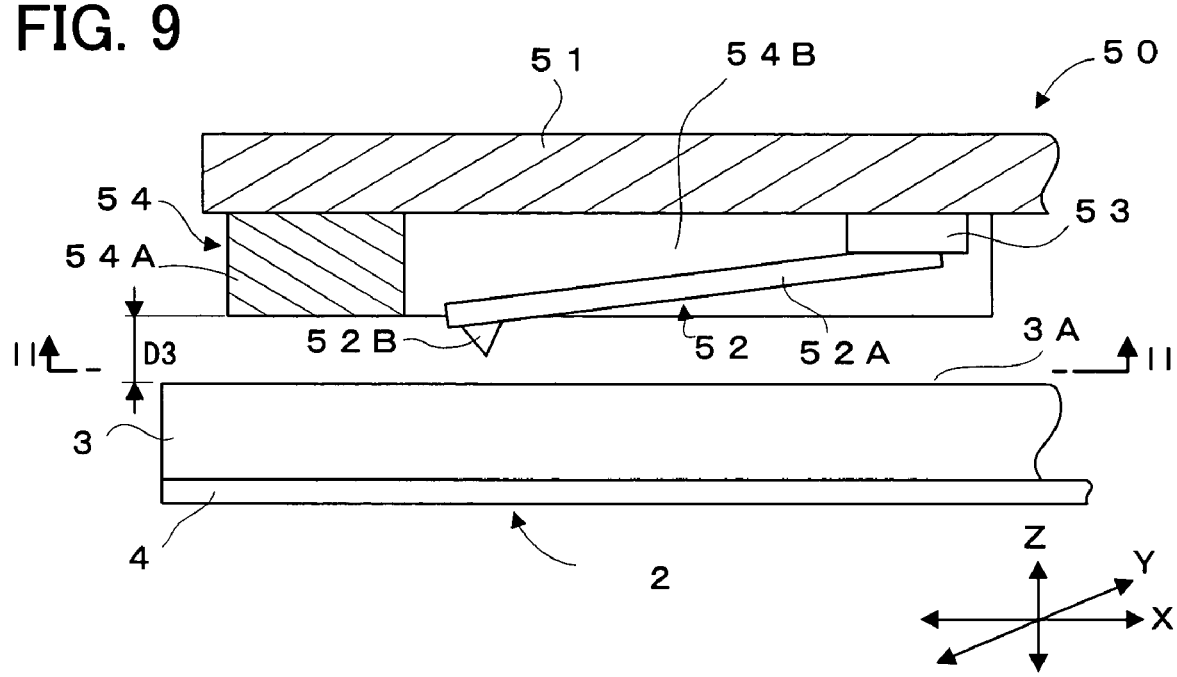
FIG. 9 is a partially sectional view showing an information recording/reading head associated with a third example of the present invention along with an information recording medium.
Figure 10:
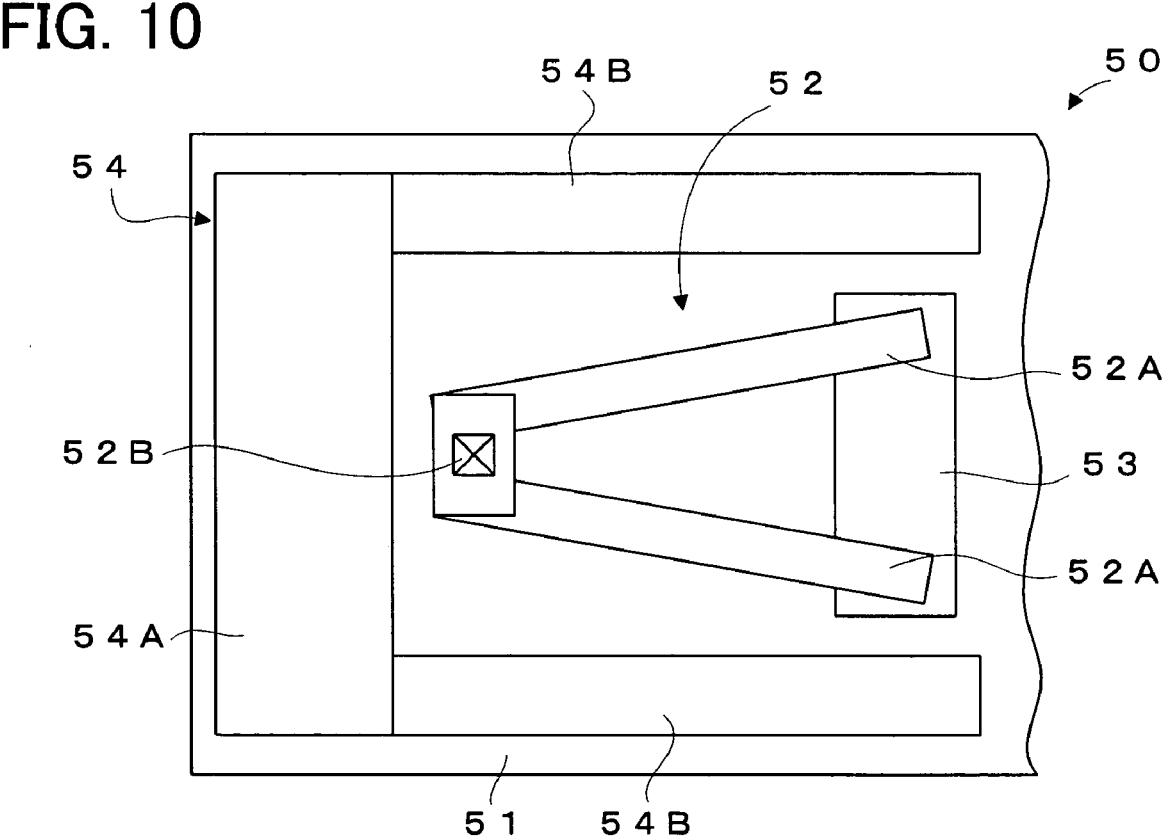
FIG. 10 is a plan view of the information recording/reading head in the FIG. 9 viewed from the direction of arrows II—II.

FIG. 9 and FIG. 10 show an information recording/reading head associated with the third example of the present invention. FIG. 9 is a cross sectional view of the information recording/reading head viewed from the side. FIG. 10 is a plan view of the information recording/reading head in the FIG. 9 viewed from the direction of arrows II—II.

As shown in FIG. 9, an information recording/reading head 50 associated with the third example of the present invention is provided with: a support substrate 51; a cantilever 52; a cantilever support portion 53; and a guard 54.

The support substrate 51 is formed of a silicon substrate, for example, and is placed above the recording surface of the information recording medium 2. A positional relationship between the support substrate 51 and the information recording medium 2 is changed by the information recording medium 2 moving in the X direction or in the Y direction in FIG. 9.

The cantilever 52 is provided with: two cantilever arms 52A; and a projection (a probe tip) 52B. The cantilever arms 52A are independently fixed to the cantilever support portion 53, and are connected to each other on their tip portion sides. The projection 52B is fixed to the tip portions at which the two cantilever arms 52A are connected to each other. It projects to the recording surface 3A of the information recording medium 2 from the tip portions of the cantilever arms 52A. The cantilever arms 52A and the projection 52B are formed of a silicon material, for example. A tip portion of the projection 52B is between several and several dozen nanometers in diameter. Incidentally, the cantilever arms 52A can be formed by a pattern formation process by a lithography using a photolithography technique, an electron beam, or an X ray and by an etching process. Moreover, the projection 52B can be formed by using the field evaporation. Furthermore, the number of cantilever arms is not limited to two, but may be one.

The cantilever 52 is electrically connected to an electrode formed on the support substrate 51 (which is not illustrated). This causes a pulse signal or an AC signal to be applied to the cantilever 52 through this electrode and to be applied to the ferroelectric film 3 of the information recording medium 2 through the projection 52B.

The guard 54 is supported by or integrally formed with the support substrate 51. The guard 54 is placed around the cantilever 52 with a predetermined space from the cantilever 52 and is placed in the vicinity of the projection 52B to be U-shaped. Namely, in the information recording/reading head 50, if it is assumed that the basal portion side of the cantilever arms 52A of the cantilever 52 is "the backside" and that the tip portion sides of the cantilever arms 52A is "the front side", the guard 54 is provided with: a guard member 54A placed on a front site of the information recording/reading head 50; and guard members 54B placed independently on left and right sites of the information recording/reading head 50.

Moreover, a predetermined distance D3 between the guard 54 and the recording surface 3A of the information recording medium 2 is between about 10 and 120 nanometers. The predetermined distance D3 is set to be longer than a distance between the tip portion of the projection 52B and the recording surface 3A.

The guard 54 can be integrally and continuously formed with the support substrate 51 which is formed of a silicon material. Therefore, it is possible to product the information recording/reading head 50 by an easy production method in which while ensuring a space for placing the cantilever 52, the guard 54 is integrally and continuously formed on the support substrate 51 and in which the cantilever 51 is then formed on the support substrate 51.

According to the information recording/reading head 50 having such a construction, it is possible to prevent dusts from touching the cantilever 52 by providing the guard 54 to surround the cantilever 52 substantially. This makes it possible to increase the information recording and reproduction accuracy and the durability of the information recording/reading head 50, as in the above-described first example and the like.

Figure 11:
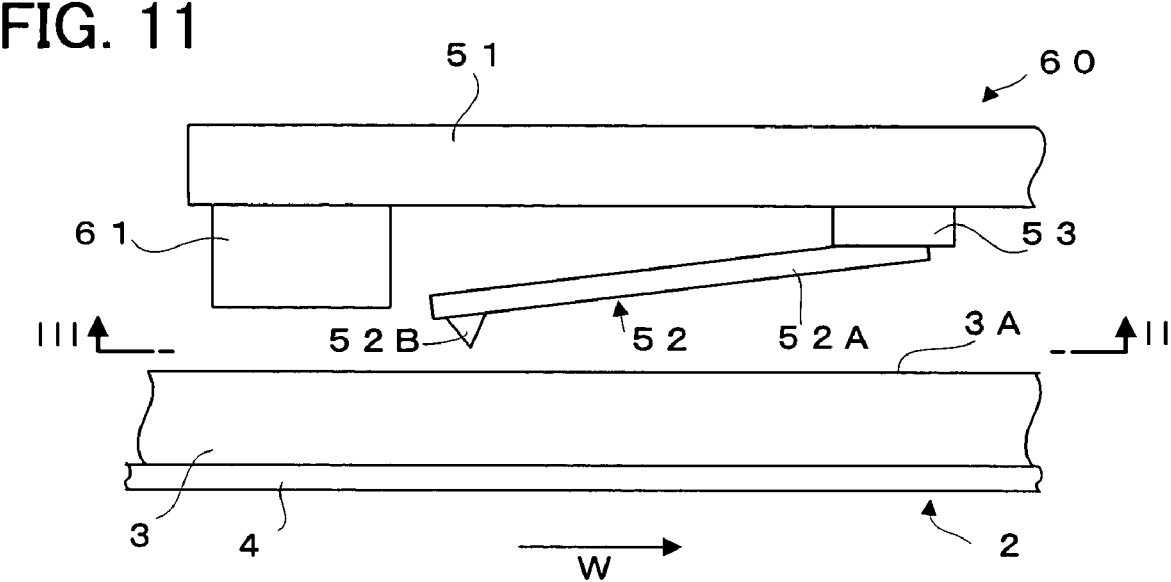
FIG. 11 is a side view showing a modified example of the information recording/reading head associated with the third example of the present invention along with an information recording medium.
Figure 12:
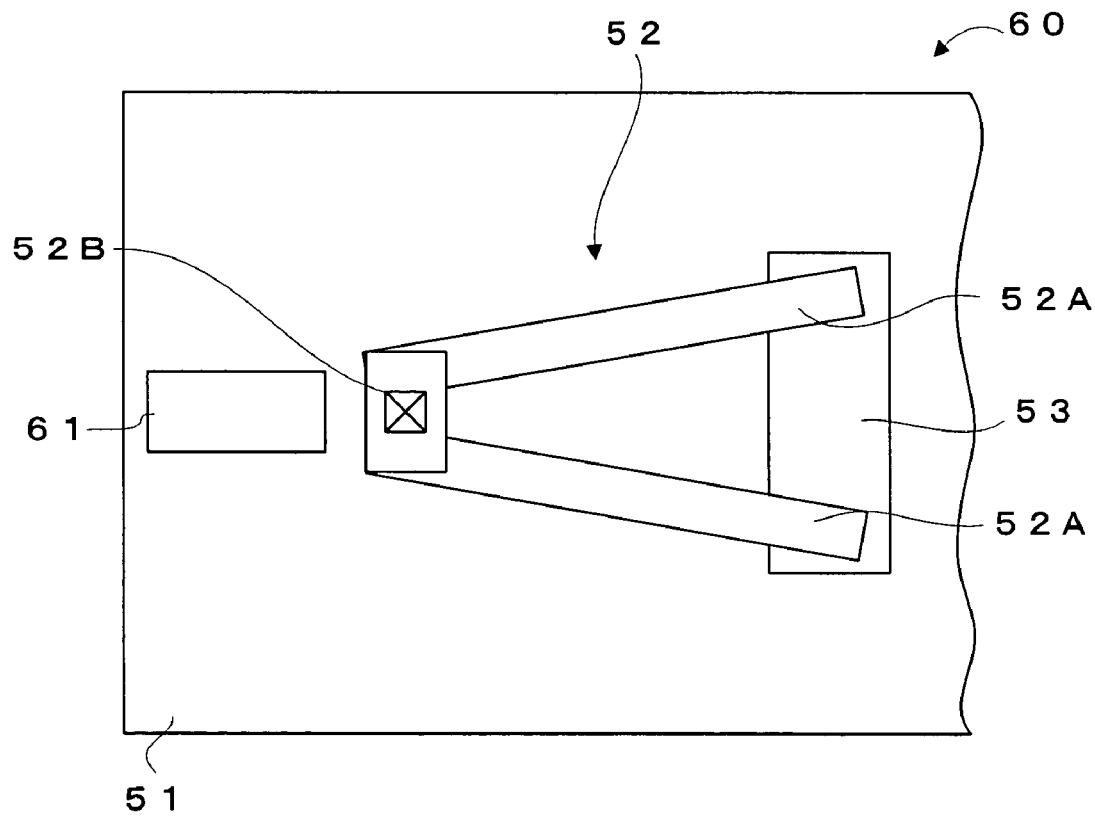
FIG. 12 is a plan view of the information recording/reading head in the FIG. 11 viewed from the direction of arrows III—III.

Incidentally, the information recording/reading head 50 shown in FIG. 9 and FIG. 10 is constructed to place the guard members 54A and 54B on each of the front, left, and right sites of the information recording/reading head 50, but the present invention is not limited to this construction. For example, by mounting a guard member even on a back site of the information recording/reading head 50, the protection of the cantilever 52 may be strengthened. On the other hand, when the moving direction of the information recording medium 2 is only a one-way direction (a direction of an arrow W in FIG. 11) as in an information recording/reading head 60 shown in FIG. 11 and FIG. 12, a guard 61 may be placed only at a front site of the information recording/reading head 60. For example, when the information recording medium 2 is a disc-type recording medium and is constructed to rotate, the moving direction of the information recording medium 2 is only the direction of the arrow W. In this case, dusts approach from the front of the information recording/reading head 60, so that they may possibly collide with the front site of the information recording/reading head 60, but a possibility to collide with the other sites is relatively low. Therefore, by placing the guard 61 only on the front site of the information recording/reading head 60, it is possible to prevent sufficiently the dusts from colliding with the projection 52B of the cantilever 52. Furthermore, there is only one place to provide the guard 61 for, which facilitates the manufacturing thereof and which allows the lightening of the information recording/reading head 60.

Figure 13:
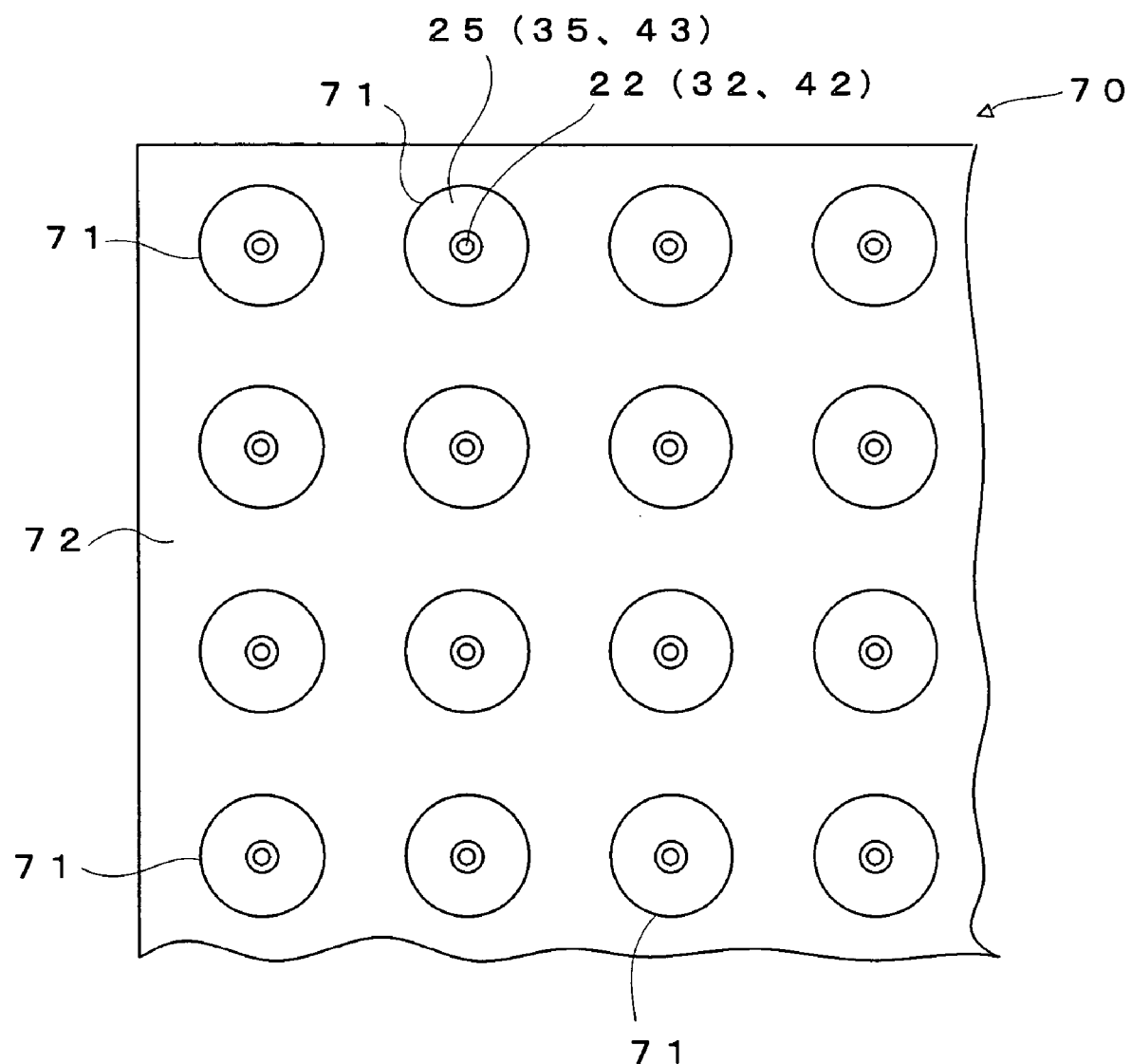
FIG. 13 is a plan view showing a modified example of the information recording/reading head associated with the examples of the present invention.

In the first or second example described above, the information recording/reading head provided with a pair of the probe and the guard or the like is given as an example, but the present invention is not limited to this example. As in an information recording/reading head 70 shown in FIG. 13, it may be constructed to have, on a support substrate 72, a plurality of probe units 71, each of which is constructed from: the probe 22 (32, 42); the guard 25 (35, 45); and the support portions for independently supporting the probe and the guard.

Figure 14:
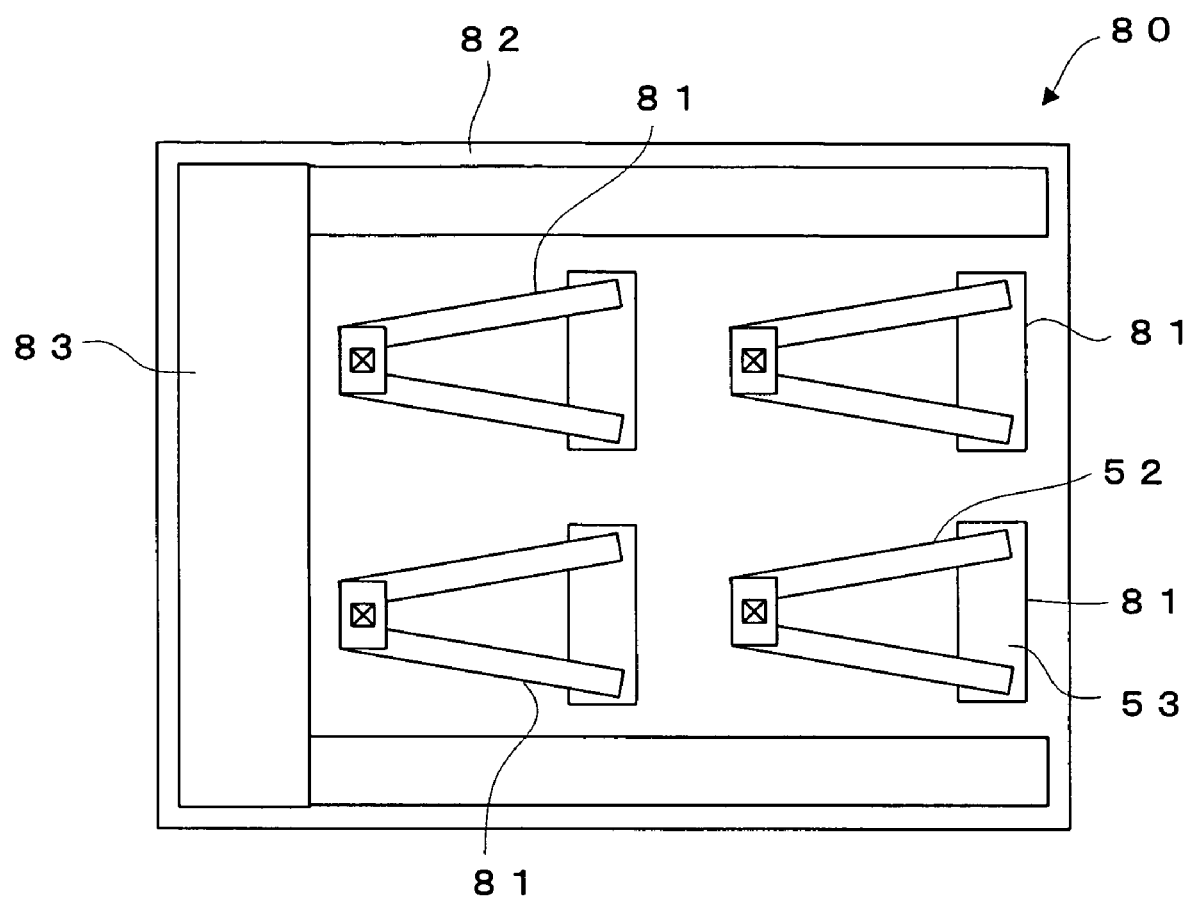
FIG. 14 is a plan view showing a modified example of the information recording/reading head associated with the examples of the present invention.

Moreover, in the above-described third example, the information recording/reading head provided with a pair of the cantilever and the guard or the like is given as an example, but the present invention is not limited to this example. As in an information recording/reading head 80 shown in FIG. 14, it may be constructed to have, on a support substrate 82, a plurality of cantilever units 81, each of which is constructed from: the cantilever 52; the cantilever support portion 53; or the like, and to have a guard 83 to surround the plurality of cantilever units 81.

Furthermore, it is also possible to perform diamond-like carbon coatings on the surface of the guard 25, 35, 54, 61, or the like, thereby to increase its strength.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-333376 filed on Nov. 18, 2002 including the specification, claims, drawings and summary is incorporated herein by reference in its entirety.

What is claimed is:

1. An information recording/reading head for recording information on a recording surface of an information recording medium or reproducing information recorded on the recording surface of the information recording medium, comprising:
    a support portion which is placed above the recording surface of the information recording medium and whose position relative to the recording surface can be changed by a position control device in a predetermined direction parallel to the recording surface;
    a probe whose one side is supported by the support portion and whose the other side extends to the recording surface; and
    a guard which is supported by the support portion and which is placed in the vicinity of the probe,
    the guard being placed at a position which is a predetermined distance away from the recording surface,
    the guard being placed at least on a forward side of the probe in a situation that the relative position of the support portion is being changed in said predetermined direction.

2. The information recording/reading head according to claim 1, wherein the guard is placed around the probe.

3. The information recording/reading head according to claim 2, wherein the guard is circular.

4. The information recording/reading head according to claim 1, wherein the guard is U-shaped.

5. The information recording/reading head according to claim 1, wherein the guard is placed only at a position on the forward side of the probe in the situation that the relative position of the support portion is being changed in said predetermined direction.

6. The information recording/reading head according to claim 1, wherein a distance between a portion of the guard closest to the recording surface and the recording surface is longer than a distance between a tip portion of the other side of the probe and the recording surface.

7. The information recording/reading head according to claim 1, wherein a distance between a portion of the guard closest to the recording surface and the recording surface is equal to a distance between a tip portion of the other side of the probe and the recording surface.

8. The information recording/reading head according to claim 1, wherein a distance between a portion of the guard closest to the recording surface and the recording surface is from 10 to 120 nanometers.

9. The information recording/reading head according to claim 1, further comprising a moving device for moving the probe in a direction substantially perpendicular to the recording surface of the information recording medium.

10. The information recording/reading head according to claim 9, wherein the moving device is constructed by attaching the probe to the support portion through a piezoelectric material.

11. The information recording/reading head according to claim 1, further comprising a moving device for moving the guard in a direction substantially perpendicular to the recording surface of the information recording medium.

12. The information recording/reading head according to claim 11, wherein the moving device is constructed by attaching the guard to the support portion through a piezoelectric material.

13. The information recording/reading head according to claim 11, wherein the moving device is constructed by forming the guard by using a piezoelectric material.

14. The information recording/reading head according to claim 1, wherein the probe is formed of a carbon nanotube.

15. The information recording/reading head according to claim 1, wherein the probe is a cantilever provided with a cantilever arm and a projection mounted on a tip portion of the cantilever arm.

16. The information recording/reading head according to claim 1, wherein
    the information recording medium is a dielectric substance, and
    the probe records information by applying a voltage to the information recording medium.

17. The information recording/reading head according to claim 16, wherein the guard is constructed from an electrode in which a predetermined electrical potential is set or earthed.

18. The information recording/reading head according to claim 1, wherein
    the support portion has a support surface which spreads in a direction parallel to the recording surface of the information recording medium and
    a plurality of probe units, each of which is constructed from the probe and the guard, are provided on the support surface.

19. The information recording/reading head according to claim 1, wherein
    the support portion has a support surface which spreads in a direction parallel to the recording surface of the information recording medium,
    a plurality of the probes are provided on the support surface, and
    the guard is placed around the plurality of the probes.

* * * * *